United States Patent Office 2,758,928
Patented Aug. 14, 1956

---

2,758,928

BAKING GREASE

Francis Frederick Hansen, Pittsburgh, Pa.

No Drawing. Application August 27, 1952,
Serial No. 306,713

5 Claims. (Cl. 99—118)

---

This invention relates to baking grease. More particularly the invention relates to edible oil grease that is polymerized and bodied to obtain good surface tension properties to cling to heated metal baking utensils to prevent the baked products from sticking to the utensils.

Mineral oil and lard oil have been used for greasing baking pans but with these oils careful attention must be given to the greasing to prevent baked products from sticking to the pans. I have found that when baking bread, cake, cookies and the like, the sticking of the baked products generally occurs at the sides of the utensils. The dough being baked contains considerable moisture which is evaporated during baking and where the steam and moisture can readily escape from the spaces, such as the sides, where the baking dough touches a pan, these are the places where the baked product sticks to the pan. Usually the bottom of the baked load of bread does not stick to the bottom of the pan.

It is well known that greases are absorbed by bread during the baking operation, and for this same reason some states have laws preventing the use of non-edible oils, such as petroleum oils, for greasing baking pans. Many of my tests have shown that by the use of an edible oil for greasing utensils, the absorption of the grease by the baking product is effective in preventing the baked product from adhering to the walls of the baked utensil even where the steam and water fom the baking product can readily escape.

The primary object of the present invention is to provide a baking grease that is effective to prevent baked dough products from sticking to the baking utensils, and which is suitable for human consumption.

Another object of the invention is to produce a baking grease solely from edible non-drying vegetable oils.

A further object of the invention is to modify the physical properties of edible non-drying vegetable oils to adapt them to greasing baking utensils.

With these and other objects in view the invention consists in the new baking grease and the use of the grease for treating baking utensils to prevent baked products from adhering to the utensils as hereinafter described and particularly defined in the appended claims.

Of the many oils that I have treated and tested for making a baking grease, I have found that the non-drying vegetable oils, soya bean oil, cotton seed oil and peanut oil, are particularly well adapted for making a pan grease. In Table I is a list of eight fatty oils with their normal acid content, color and viscosity, which have been tested and found to have properties which permit them to be used for baking grease, but the baking grease made from soya bean, cotton seed and peanut oils are cheaper to produce and give the most satisfactory results.

Table I

| Oil | Acid | Color | Viscosity |
|---|---|---|---|
| Soya bean | .38 | 3–4 | .58 |
| Safflower | .39 | 9– | .58 |
| Corn | .20 | 4–5 | .60 |
| Rapeseed | .88 | 7 | .75 |
| Cottonseed | .2 | 3 | .58 |
| Sesame |  | 1– | .60 |
| Lard | 1.5 | 6+ | .70 |
| Peanut | .48 | 4+ | .70 |

All of these oils may be polymerized or bodied by heat treatment only. The polymerization action changes all of the physical properties of these oils to increase acid content, the color and the viscosity. To make a satisfactory baking grease I have found that viscosity of the finished grease or oil should not be less than 1.2 and the color should not be greater than 12 by the Gardner 1933 color standard. When the viscosity gets above 2.0 stokes at 77° F. it is not readily adaptable for spraying on the utensils with the commonly used spraying device. The polymerization increases the acid content of the grease, but it has been found that a grease with an acid content of not more than 2.5% is effective in wetting the utensil surface and will form a comparatively thin film which will withstand the oven temperatures used in baking dough products. A grease having an acid content above 2.5% is not suitable for absorption by baked food products.

The color of the polymerized product should not be above 12 because such dark colors tend to color the baked products. The colors having a number higher than 12 cannot be readily filtered with bone char or decolorizing clays to obtain a color of 10 or lower suitable for baking grease.

The preparation of the baking grease is critical in order to obtain a product having satisfactory properties. The vegetable fatty oils are heated in a closed container at a temperature of 20° to 35° Fahrenheit below the flash point of the raw oils. Air is excluded and the oils are heat bodied for a period of three to six hours to bring the viscosity above 1.30 stokes at 77° F. and hold the acid content below 2.6. In this heat bodying the color must not rise above 12 color Gardner. After the oil is bodied it is cooled and filtered with decolorizing clay to bring the color to 10 Gardner or below. Thereafter, one-tenth of 1% by weight of an antioxidant is added to the bodied oil to stabilize the oil against oxidation. The preferred antioxidant is sold under the trade name "Sustane" and is composed of 20% Buty hydroxyanisole, 4% citric acid, 6% propyl gallate, these three components being dissolved in 70% propylene gylcol. The Buty hydroxyanisole and propyl gallate may be used alone as antioxidants but it is necessary to use up to one half of 1% of these compounds to prevent oxidation of the grease.

In the heat bodying operation it is desirable to avoid as much as possible the formation of acid by air oxidation. Therefore the viscosity is increased by polymerization of the oil in the absence of air. The bodying operation is carried on rapidly with as high temperatures as are practical because long heating periods act to darken the color. Therefore the oils are generally heated to a temperature about 25° F. below the flash point to carry out the polymerization reaction.

In Table II is shown the data obtained in polymerizing seven vegetable fatty oils and lard oil at a temperature about 25° F. below the flash point.

Table II

| Hours of Heating | Three | | | Six | | | Nine | | |
|---|---|---|---|---|---|---|---|---|---|
| Oil | Acid | Color | Viscosity | Acid | Color | Viscosity | Acid | Color | Viscosity |
| Soya bean | 1.6 | 7 | 1.0 | 2.4 | 10-11 | 1.9 | 2.9 | 12-13 | 4.55 |
| Safflower | 1.3 | 5 | .75 | 1.8 | 8 | 1.4 | 2.3 | 9-10 | 2.65 |
| Corn | 1.7 | 7 | .85 | 2.4 | 10+ | 1.5 | 2.7 | 12+ | 3.0 |
| Rapeseed | 2.1 | 8 | 1.3 | 2.7 | 11-12 | 1.82 | 3.4 | 13 | 2.60 |
| Cottonseed | 1.3 | 6-7 | .90 | 2.3 | 10+ | 1.65 | 2.3 | 12 | 3.0 |
| Sesame | 1.4 | 5-6 | .85 | 2.0 | 10 | 1.35 | 2.7 | 12+ | 2.35 |
| Lard | 2.2 | 12-13 | 1.0 | 2.6 | 15-16 | 1.35 | 3.0 | 17-18 | 2.1 |
| Peanut | 1.7 | 8-9 | 1.0 | 2.5 | 11-12 | 1.35 | 2.8 | 14 | 2.25 |

From this table it will be seen that a heat polymerization of the fatty oils for a period of three to six hours will give the most satisfactory products. When the oils are heated for nine hours the acid contents are too high and the colors are generally bad. Further, the viscosity is generally so high that the product is not suitable for spraying.

Of the products polymerized as shown in Table II, soya bean, cottonseed and peanut oil provide the most satisfactory baking grease. These oils have a smoke point above the baking temperature of bread, cake, pies, cookies and the like, so that the greases do not impart any odor or flavor to the baked products.

The preferred form of the invention having been thus described, what is claimed as new is:

1. A baking grease comprising a vegetable oil, bodied by heat only at a temperature of 25° to 35° F. below its flash point for a period of three to six hours and having an acid content less than 2.6%, a color less than 12 Gardner standard, and a viscosity between 1.3 and 2.0 stokes at 77° F.
2. The baking grease defined in claim 1 in which the polymerized oil is stabilized with less than one percentage of antioxidant.
3. The baking grease defined in claim 1 which is produced from the group of vegetable fatty oils consisting of soya bean, cottonseed, peanut, rapeseed, and sesame.
4. A baking grease consisting of a stabilized polymerized without oxidation vegetable oil having an acid content less than 2.6%, a Gardner color of ten or lower and a viscosity between 1.3 and 2.0 stokes at 77° F.
5. A method of making a baking grease comprising heating a vegetable oil of the group consisting of soya bean, cotton seed, peanut, rapeseed and sesame at a temperature of 20° to 35° F. below the flash point of the oils while avoiding oxidation for a period of three to six hours, cooling the polymerized body, filtering the cooled product with a decolorizer to bring the color to Gardner ten or lower and stabilizing the polymerized product with less than one per cent by weight of an anti-oxidant.

References Cited in the file of this patent

UNITED STATES PATENTS

| | | |
|---|---|---|
| 1,067,978 | Ellis | July 22, 1913 |
| 1,151,002 | Ellis | Aug. 24, 1915 |
| 2,249,115 | Corkery | July 15, 1941 |
| 2,559,481 | Truesdell | July 3, 1951 |

OTHER REFERENCES

Bailey: Industrial Oil and Fat Products, 1951, pages 94, 95, 896 and 898.